United States Patent

[11] 3,628,019

| [72] | Inventor | Thomas P. Jackson<br>721 Springfield St., P.O. Box 893, Dayton, Ohio 45401 |
|---|---|---|
| [21] | Appl. No. | 806,925 |
| [22] | Filed | Mar. 13, 1969 |
| [45] | Patented | Dec. 14, 1971 |

[54] LOW-ENERGY DOSIMETER AND METHOD OF MAKING SAME
19 Claims, 16 Drawing Figs.

[52] U.S. Cl. .................................................. 250/83.3, 250/83.6
[51] Int. Cl. .................................................. G01t 1/16
[50] Field of Search ........................................... 250/83.3 PD, 83.6; 313/93; 324/33; 29/25.13

[56] References Cited
UNITED STATES PATENTS

| 2,875,343 | 2/1959 | Birkhoff et al. | 250/83.3 |
| 2,997,589 | 8/1961 | Argabrite | 250/83.3 |
| 3,411,004 | 11/1968 | Frank | 250/83.3 |

*Primary Examiner*—James W. Lawrence
*Assistant Examiner*—Davis L. Willis
*Attorney*—Darby & Darby ABSTRACT: A reliable low-energy dosimeter, and method of making same, which is capable of precisely measuring radiation at low-energy levels of approximately 30 Kev. and less; yet, such dosimeter is easily manufactured using conventional equipment.

PATENTED DEC 14 1971
3,628,019
SHEET 1 OF 2
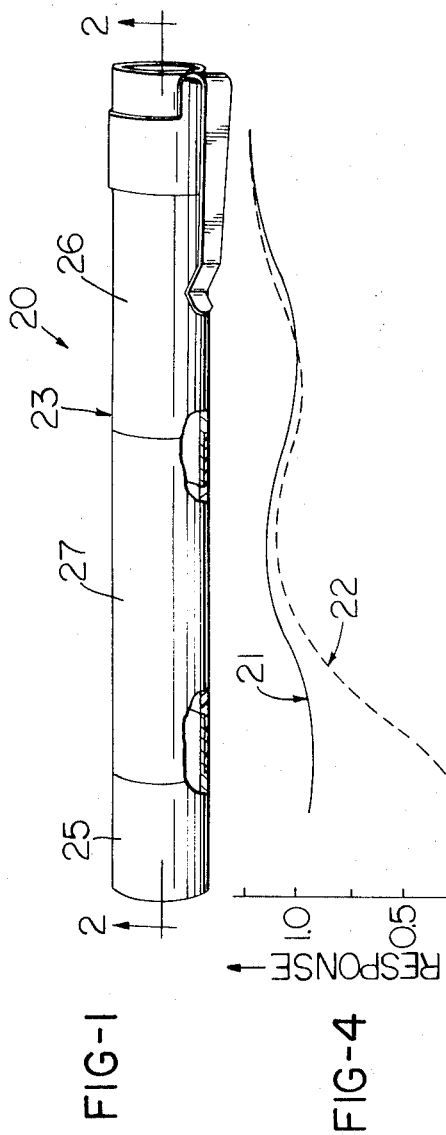
FIG-1
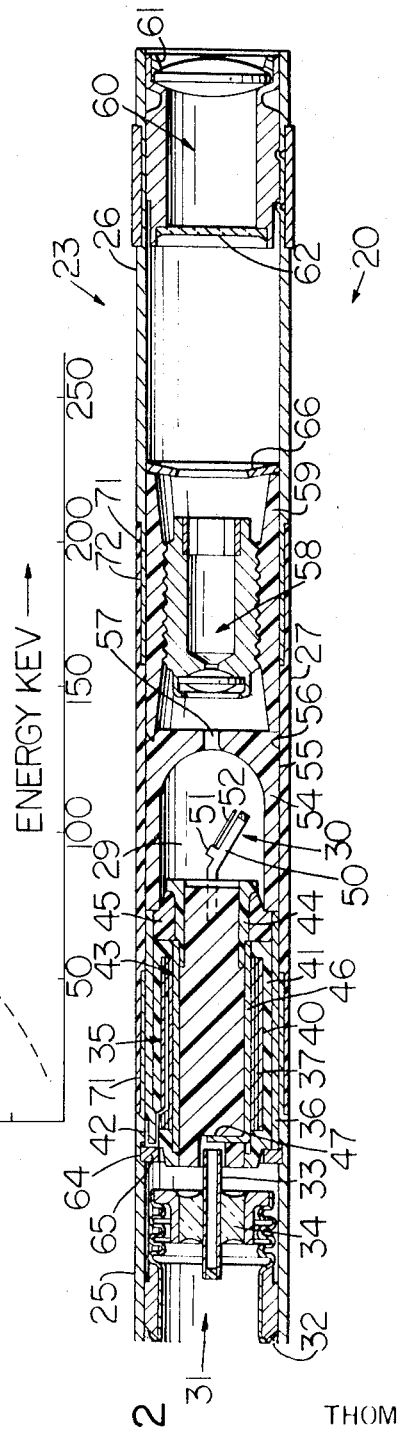
FIG-2
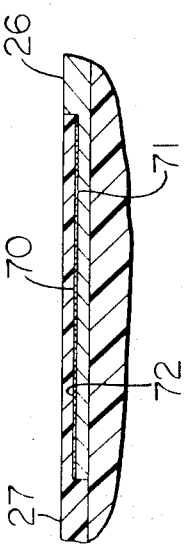
FIG-3
FIG-4
INVENTOR
THOMAS P. JACKSON
BY Ernest J. Hy
HIS ATTORNEY

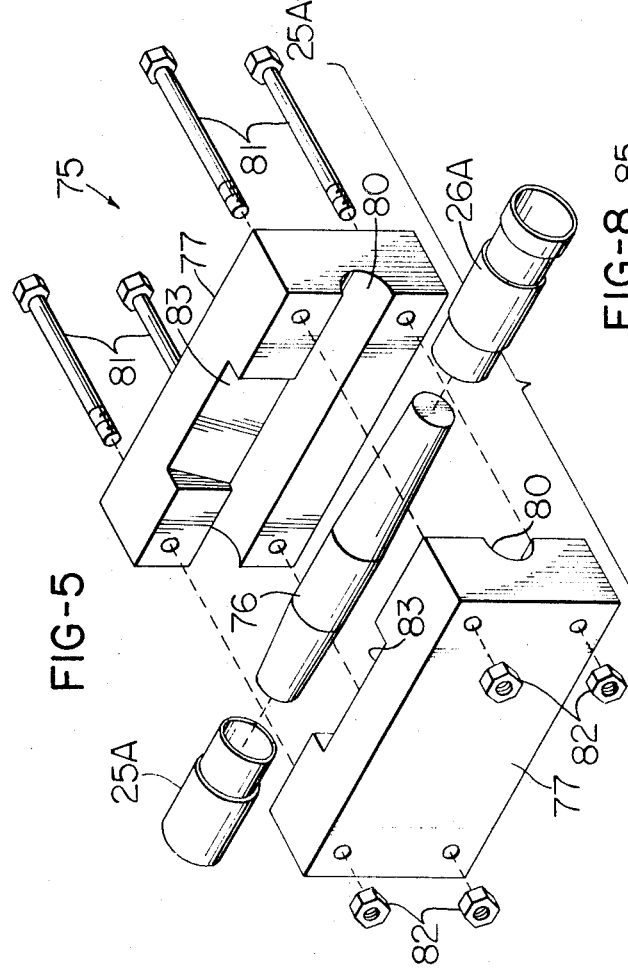
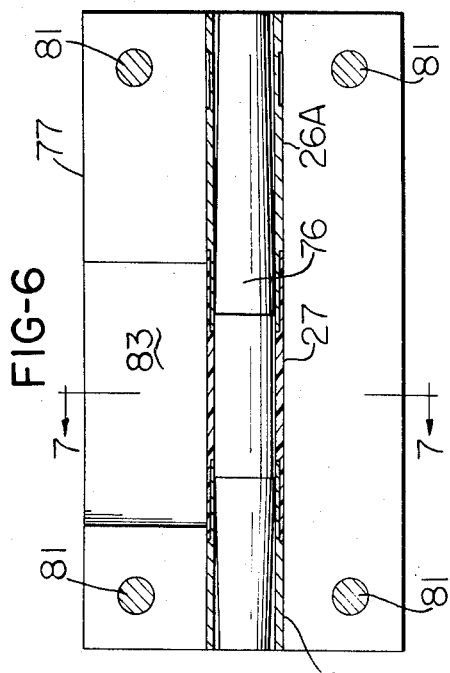
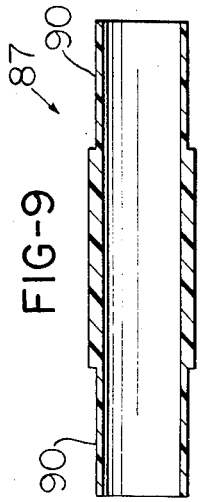
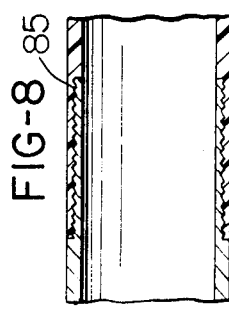
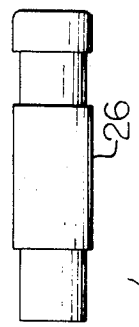
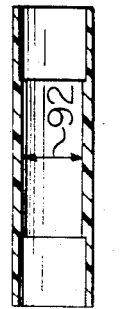
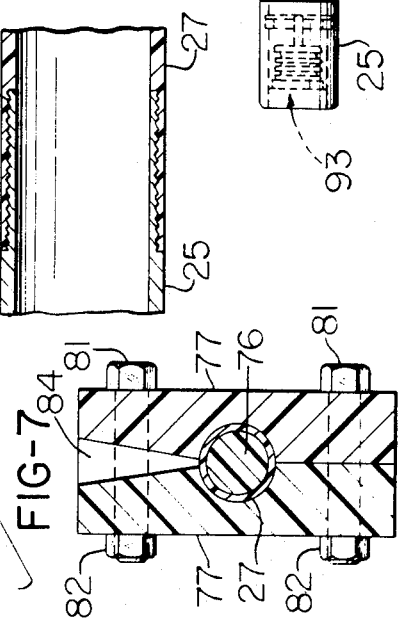
INVENTOR
THOMAS P. JACKSON
BY Ernest J. Hix
HIS ATTORNEY

LOW-ENERGY DOSIMETER AND METHOD OF MAKING SAME

BACKGROUND OF THE INVENTION

Most of the dosimeters in present use have an outer housing or barrel made of a metal such as aluminum, for example, and each of such dosimeters has a response which is substantially flat at high-energy ranges between roughly 100 Kev. and 1.3 Mev. However, each of these dosimeters which is housed in a metal barrel has a poor response at low-energy levels generally of the order of 30 Kev. and such poor response is due primarily to the radiation attenuation characteristics of the metal barrel.

In an effort to provide dosimeters having improved response in the lower energy ranges, it has been proposed heretofore to make the entire outer barrel of plastic materials which have better radiation attenuation characteristics in the low-energy ranges. However, dosimeters made with all-plastic outer barrels are unsatisfactory because it is difficult to maintain proper seals and such dosimeters are prone to comparatively rapid electrical leakage after assembly causing discharging thereof and thereby giving a false and erroneous indication of irradiation. In addition, direct-reading dosimeters made with all-plastic outer barrels have integral lenses which are difficult to keep in focus.

SUMMARY

This invention provides an improved dosimeter, and a method of making same, which is of simple and economical construction, may be manufactured using existing machinery and tooling, has improved seals, is not prone to electrical leakage even after extended use, and has improved response at low-energy levels generally of the order of 30 Kev.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a perspective view with parts in cross section and parts broken away illustrating one exemplary embodiment of a low-energy direct reading dosimeter of this invention;

FIG. 2 is a cross-sectional view taken essentially on the line 2—2 of FIG. 1;

FIG. 3 is a greatly enlarged, fragmentary, cross-sectional view particularly illustrating the manner of fastening the central section of the housing comprising the dosimeter of FIG. 1 to one of the end sections utilizing adhesive means;

FIG. 4 is a graph comparing the response at various energy levels of the exemplary dosimeter of this invention with a standard dosimeter made with an all-aluminum outer housing;

FIG. 5 is an exploded perspective view particularly illustrating one embodiment of mold means which may be used to form the central section of the outer tubular housing comprising the dosimeter of FIG. 1 of a plasticlike material;

FIG. 6 is a longitudinal cross-sectional view taken through the plane of junction of the assembled mold halves comprising the mold means of FIG. 5 and particularly showing the configuration of the central section of the outer housing of the dosimeter of FIG. 1;

FIG. 7 is a cross-sectional view taken on line 7—7 of FIG. 6;

FIG. 8 is a fragmentary cross-sectional view illustrating a modified form of a central section which may be used to make the outer housing of the dosimeter of FIG. 1;

FIG. 9 is a cross-sectional view illustrating another modified form of a central section which may be used to make the outer housing of the dosimeter of FIG. 1; and FIG. 10 is a view illustrating the central section of the outer housing of a dosimeter made from tubular stock which is suitably cut to length and adapted to be fixed in position over associated end sections.

DESCRIPTION OF ILLUSTRATED EMBODIMENTS

Reference is now made to FIGS. 1 and 2 of the drawings which illustrate one exemplary embodiment of a low-energy dosimeter which is designated generally by the reference numeral 20. The exemplary dosimeter 20 is of the direct reading type and is particularly adapted to measure gamma and X-ray radiation with precision at low-energy levels of roughly 30 Kev. and even less. Yet, the dosimeter 20 is capable of being manufactured with optimum economy while utilizing the standard tooling which is normally used in the manufacture of dosimeters having an all-metal outer housing.

The dosimeter 20 of this invention provides a typical response as shown by the solid line curve at 21 in FIG. 4 when plotting response in arbitrary units versus energy in Kev. whereby it will be seen that a substantially flat response curve is provided in the energy range between roughly 30 Kev. and 250 Kev. By contrast, most presently used dosimeters which have an outer housing or barrel made of a metallic material such as aluminum have a typical response as shown by the dotted line curve at 22. From these two curves it is apparent that the dosimeter 20 is capable of measuring exposures to radiation with increased efficiency and hence greater accuracy at the low energy levels.

The dosimeter 20 has an outer tubular housing 23 which is comprised of a plurality of three end-to-end tubular sections defined by oppositely arranged end sections 25 and 26 and a central section 27 which is made of a material having a total mass attenuation coefficient which is substantially constant over a desired energy range. In this example of the invention the central section 27 is made of a plasticlike material having a total mass attenuation coefficient which enables the dosimeter 20 to accurately detect radiation in the energy range between roughly 30 Kev. and 250 Kev. and as previously mentioned.

The dosimeter 20 has an ionization chamber 29 and the central section 27 is provided so that it surrounds the ionization chamber 29 which has a quartz fiber electrometer 30 supported therewithin. When the dosimeter 20 is exposed to radiation electrons are admitted into the ion chamber 29 in a known manner thereby electrically discharging the electrometer as a function of the radiation which passes into the chamber 29 and the amount of discharge can be read directly from the dosimeter as will be explained in more detail subsequently.

The dosimeter 20 comprises a bellows and seal assembly 31 which is suitably soldered, as indicated at 32, to end portion 25 of the outer housing 23 and the assembly 31 has a charging pin 33 suitably embedded in a glass support 34. The assembly 31 enables axial movement of the charging pin 33 while maintaining a tight seal between the housing section 25 and the seal assembly 31 to enable charging of a condenser 35 carried primarily within section 25.

The condenser 35 has an outer sleeve 36 and a plurality of windings 37 formed of alternate layers of insulative and conductive materials carried within a cylindrical recess 40 of a tubular insulator 41. A grounding member 42 for the condenser 35 is also provided and contacts the windings 37 of the condenser 35 and the outer end section 25 of housing 23.

A conductive sleeve assembly 43 is also provided and is comprised of a carbon-loaded conductive plastic member 44 which is supported on a substantially annular plastic insulator 45 and the member 44 has an electrically conductive rear cylindrical portion 46 which is suitably electrically connected to the forward portion 44. The conductive portion 46 has a conductive transverse leg portion 47 which is adapted to be engaged by the charging pin 33 to enable charging of the condenser 35 in a known manner.

The forward end of the sleeve 44 has a substantially U-shaped frame 50 made of a conductive material and the frame 50 is provided with a pair of lugs 51 near the outer ends of its outwardly extending legs and the lugs 51 support a fine fiber 52 which has a U-shaped configuration which corresponds to the configuration of the frame 50. The fiber 52 may comprise a quartz or borosilicate glass core, for example, having a metallic coating suitably provided thereon so that the fiber 52 may have any desired predetermined resistance.

A carbon-loaded plastic conductive member 54 is also provided and has a cavity 29 therein which defines the ionization chamber 29 and the outside surface 55 of member 54 is arranged against the inside surface 56 of central section 27. As in the case of central section 27, it will be appreciated that the material used to make member 54 also has a total mass attenuation coefficient which is substantially constant over the desired energy range. It will also be seen that the frame 50 and fiber 52 define the previously mentioned electrometer 30 which is carried within the chamber 29. The member 54 also has an opening 57 provided therein which enables the electrometer to be readily observed.

The dosimeter 20 has an objective lens assembly 58 which is suitably threadedly fastened in an internally threaded sleeve 59 which has an outside cylindrical surface slidably supported within the corresponding cylindrical surface of the outer housing 23. The dosimeter 20 also has an eyepiece assembly 60 which is staked in position and suitably sealed to the housing section 26, as by soldering indicated at 61, and the eyepiece assembly has a reticle 62 provided as an integral part thereof and provided with suitable markings thereon. The dosimeter 20 may be easily read by pointing it toward a light source and looking through the eyepiece assembly 60 and objective lens assembly 58 whereby the position of the fiber 52 of the electrometer 30 may be compared with markings on the reticle 62 to give a direct reading of exposure to radiation.

The main operating portions of the dosimeter 20 arranged intermediate of the bellows and seal assembly 31 and the eyepiece assembly 60 are held in an axially loaded condition by making full use primarily of the metallic end sections 25 and 26 while using the central section 27 mainly as a confining member and a housing for the ionization chamber 29. Thus, special attention may be given to making the central section 27 of a material having the desired total mass attenuation coefficient for any desired energy range making it possible to provide a reliable precision dosimeter for any desired energy range and for measuring any desired type of radiation.

In particular, it will be that an annular groove 64 is provided in the metal end section 25 and a retaining ring such as a snapring 65 is inserted in position within the groove 64. The condenser 35, electrometer 30 and its cooperating components, member 54 having the ionization chamber 29 defined therein, and the objective lens assembly 58 are all urged axially toward the retaining ring 65 and held tightly thereagainst by an annular spring-loaded washer 66. Thus, it is seen that the dosimeter 20 has its eyepiece assembly 60 and its bellows and seal assembly 31 tightly sealed to metal end sections 26 and 25 respectively while the central section 27 has its end portions telescoped over sections 25 and 26 and suitably fixed thereto in a sealed manner whereby the dosimeter 20 is provided with high quality seals even though its central section 27 is made of material having special properties which give the dosimeter 20 the desired response characteristics at low-energy levels.

As seen in FIGS. 2 and 3 of the drawings, the central section 27 and each of the end sections 25 and 26 have portions thereof arranged in telescoped relation and suitably fixed together in a sealed manner. In particular, each end section 25 and 26 has a reduced diameter inner portion of a given diameter as indicated at 71 and the central section 27 has opposite end portions provided with an inside diameter 72 which is larger than the inside diameter of the central part of section 27 and diameter 72 corresponds to the reduced diameter 71. Thus, it is a simple matter to telescope each end portion of the central section 27 over an inner portion of an associated end section 25 or 26 and the central section 27 may be fixed to end sections 25 and 26 with an epoxy resin 70, see FIG. 3.

The central section 27 may be made of any suitable material such as a plasticlike or plastic material, for example, which may be formed in a suitable mold means or mold assembly 75, see, FIG. 5. The mold assembly 75 comprises a central mandrel 76 and a pair of substantially identical mold sections 77 each having a substantially semicylindrical surface 80 defined therein. The mold sections 77 are adapted to be fastened together with the mandrel 76 suitably positioned therewithin utilizing a plurality of bolts 81 and cooperating nuts 82. Each mold section 77 has a slot 83 in its top portion and upon assembling the mold sections 77 together the slots 83 cooperate to define an opening 84 in the top of the mold assembly, see FIG. 7, through which a liquid plastic material may be introduced to enable molding of the central section 27 using known molding techniques.

The mold assembly 75 may also have a pair of end members 25A and 26A which have configurations which are substantially identical to end sections 25 and 26, respectively. The members 25A and 26A may be used as masters in molding the central section 27 whereupon once a plastic material has been poured in the assembled mold 75 and allowed to solidify, see FIG. 6, the mold sections 77 may be separated by unfastening the bolts 81 and nuts 82 and the members 25A and 26A may then be pulled away from the mandrel 76 allowing easy removal of such mandrel from within the completely defined central section 27.

It will also be appreciated that in the event that any material has solidified within the opening 84 during the molding of the central section 27, it is a simple matter to merely cut any excess material away from the central section 27 utilizing any known conventional technique, such as grinding, for example. Also, the mold sections 77 and mandrel 76 may be made of any suitable material which enables efficient molding without tendency of the molded member 27 to adhere thereagainst.

The mold assembly 75 has been described as being provided with members 25A and 26A which are used as masters which may be reused to enable molding of a plurality of central sections 27. However, it will be appreciated that the members 25A and 26A may be replaced with actual end sections 25 and 26 which may be either pulled away from the central section 27 after molding thereof and adhesively fastened in position in the manner illustrated in FIG. 3 or molding may be achieved utilizing suitable materials such that not only is the central section 27 formed by molding but the molded section 27 is substantially simultaneously bonded to the end sections 25 and 26 during the molding process.

In those applications where it is desired to mold and simultaneously fasten the central section 27 between end sections 25 and 26, a plurality of projections 85 may be provided on the reduced diameter end portions of each end section 25 and 26, only a portion of end section 25 is shown in FIG. 8 with its projections 85. The projections 85 provide a greater surface area against which the central plastic section 27 may be bonded to provide a high-strength connection as well as a seal of optimum quality.

The assembled mold 75 with its opening 84 is particularly adapted to enable pouring of a plasticlike material such as an epoxy resin within the mold cavity by gravity. However, it will be appreciated that any suitable molding technique may be utilized to form the central section 27, such as injection molding, for example, wherein the opening 84 would be suitably modified to enable such injection molding.

Another exemplary embodiment of a plastic central housing section is illustrated in FIG. 9 of the drawings and is designated by the reference numeral 87 and the tubular section 87 may be made of the identical material used in making the tubular section 27. The central section 87 differs from section 27 in that it has reduced diameter opposed end portions 90 over which associated counterbored end portions of suitably modified end sections 25 and 26 may be telescoped.

The central section may also be made using a substantially standard cylindrical tubing section 91 as shown in FIG. 10 which is selected so that its inside diameter 92 corresponds to the inside diameter of the end sections 25 and 26. The end portions of section 91 may then be suitably counterbored to provide a section similar in configuration to section 27. The section 91 may be made of the identical material used in making section 27 and suitably fixed in position between end sections 25 and 26 in a sealed manner.

Regardless of the particular configuration or method of making the central section of the outer housing of a given dosimeter, it will be appreciated that it may be desired in some applications to preassemble the bellows and seal assembly 31 within the end section 25 as illustrated at 93 in FIG. 10 whereupon the end sections 25, 26, and 27 may be suitably fixed together after installing the ring 65 in position.

In each dosimeter made in accordance with this invention, the main components are axially loaded and held tightly between the retaining ring 65 and the spring 66 and these two members engage and are suitably supported by metal end portions 25 and 26 respectively whereby there is little likelihood of relative movement between such main components and the outer housing. Likewise, the bellows and seal assembly 31 and the eyepiece assembly 60 are also fixed to metal end sections 25 and 26 respectively. Thus, the central section 27 is used primarily to house the ionization chamber and the material used to make central section 27 is selected to assure that the dosimeter 20 provides optimum performance over the desired energy range.

By using end sections made of metal the dosimeter 20 may be tightly sealed at its ends using common sealing techniques. Further, the dosimeter may be made using practically all of the existing tooling used to make similar dosimeters having all-metal barrels.

As previously indicated, the section of material surrounding the ionization chamber is made of a material having a total mass attenuation coefficient which is substantially constant over the desired energy range. In one exemplary application in this invention it was found that by making the central section 27 of a polycarbonate sold under the trade name of Lexan by the General Electric Company of Pittsfield, Mass., it was possible to provide an instrument which gave reliable precision performance while measuring both gamma and X-ray radiation over energy ranges of somewhat less than 30 Kev. to 250 Kev.

In this example of the invention the dosimeter 20 is illustrated as a direct reading dosimeter particularly adapted to measure gamma and X-ray radiation. However, it will be appreciated that the teachings of this invention may be utilized in providing dosimeters used in measuring other types of radiation. Further, the term "dosimeter" as used in this specification and claims in intended to cover not only instruments of the direct reading type but other types of instruments which may not be direct reading and require separate devices to enable reading thereof.

While present exemplary embodiments of this invention, and methods of practicing the same, have been illustrated and described, it will be recognized that this invention may be otherwise variously embodied and practiced by those skilled in the art.

I claim:

1. A dosimeter for detecting radiation comprising an outer tubular housing comprised of a plurality of end-to-end tubular sections, a first tubular section formed with an ionization chamber therein and being made of a material having a total mass attenuation coefficient which is substantially constant over a desired energy range having a low end at least 30 Kev. and a second tubular section being made of easily fabricated material means particularly adapted to enable easy installation of the components of said dosimeter therewithin and containing therein a charging electrode, said first and second tubular sections fitting together to provide communication between the charging electrode and the ionization chamber.

2. A dosimeter as set forth in claim 1 in which said first and second tubular sections have portions thereof arranged in telescoped relation and fixed together in a sealed manner to prevent electrical leakage.

3. A dosimeter as in claim 1 wherein said first tabular section is of plastic material.

4. A dosimeter as set forth in claim 1 in which said tubular housing further includes a third tubular section having optical means, said second and said third tubular sections defining end sections and made of metal with said first tubular section being fixed in position between said end sections.

5. A dosimeter as set forth in claim 4 in which said first tubular section and each of said end sections have associated portions arranged in telescoped relation and fixed together in a sealed manner to prevent electrical leakage.

6. A dosimeter as set forth in claim 4 in which each of said end sections has a reduced diameter inner portion of a given diameter, said first tubular section has a counterbore in its opposite end portions, each counterbore having an inside diameter corresponding to said given diameter enabling fitting of said first tubular section with each of its end portions telescoped over an inner portion of an associated end section.

7. A dosimeter as set forth in claim 4 in which each of said end sections has a reduced diameter inner portion provided with integral outwardly extending projections which enable said sections to be sealed together in an optimum manner.

8. A dosimeter for detecting radiation comprising, an ionization chamber and an outer tubular housing comprised of tubular sections defined by oppositely arranged end sections made of metal with one section being fixed in position between said end sections, said one section being arranged surrounding said ionization chamber and being made of a material having a total mass attenuation coefficient which is substantially constant over a desired energy range of from at least 30 Kev. to about 250 Kev.

9. A dosimeter as set forth in claim 8 in which said material comprises a polycarbonate.

10. A dosimeter as set forth in claim 8 in which said ionization chamber is formed in an electrically conductive member having a cylindrical outer surface which adjoins a corresponding cylindrical inside surface of said one section.

11. A method of making a dosimeter comprising the method steps of providing an end section means made of easily fabricated material means having a charging electrode therein, forming one section of said housing of a material having a total mass attenuation coefficient which is substantially constant over a desired energy range with an ionization chamber, therein and fixing said one section in a sealed manner to said end section means in end-to-end relation to define said housing with said charging electrode in communication with said ionization chamber.

12. A method as set forth in claim 11 in which said material for said one section comprises a plastic material and said forming step comprises molding said plastic material using associated mold means.

13. A method as set forth in claim 11 in which said material comprises a plastic material and said forming and fixing steps are achieved simultaneously by molding said plastic material in position against said end section means.

14. A method as set forth in claim 12 in which said fixing step comprises adhesively fixing said one section to said end section means.

15. A method as set forth in claim 11 further comprising the step of providing another end section means having optical means, said fixing step comprises arranging said one section and each of said end sections with associated portions in telescoped relation and sealing the telescoped portions together.

16. A method as set forth in claim 11 in which said material of said one piece comprises a plastic material and said forming step comprises making said one section from a length of preconstructed tubular stock.

17. A method of making a low-energy dosimeter comprising the method steps of, forming a pair of tubular end sections made of metal and adapted to define opposite end sections of a tubular housing for said dosimeter, providing one of said end sections with a charging electrode and the other of said end sections with optical means, forming a tubular central section for said housing of a material having a total mass attenuation coefficient which is substantially constant over a desired energy range with an ionization chamber, fixing said central section in a sealed manner between said end sections in end-to-end relation with said charging electrode in communication with said ionization chamber, whereby said dosimeter is capable of providing reliable precision performance over said desired energy range due to the positioning of said ionization chamber.

18. A method as set forth in claim 17 in which said forming step comprises molding said central section of a plastic material and said installing step comprises soldering each of the opposed end components of said dosimeter in position against an associated metal section.

19. A method as set forth in claim 18 in which said fixing step comprises arranging said central section and each of said metal end sections with associated portions in telescoped relation and sealing the telescoped portions together.

* * * * *